United States Patent [19]

Foye

[11] 4,172,170
[45] Oct. 23, 1979

[54] COMPOSITE UPHOLSTERY FABRIC AND METHOD OF FORMING SAME

[75] Inventor: Lawrence T. Foye, Dracut, Mass.

[73] Assignee: Joan Fabrics Corporation, Lowell, Mass.

[21] Appl. No.: 944,069

[22] Filed: Sep. 19, 1978

[51] Int. Cl.² ............................................. B32B 5/02
[52] U.S. Cl. .................................... 428/213; 28/107; 428/234; 428/235; 428/253; 428/255
[58] Field of Search .............. 428/213, 234, 235, 253, 428/255; 28/107

[56] References Cited

U.S. PATENT DOCUMENTS 1,887,979  11/1932  Levin .................................. 428/235
3,937,861  2/1976  Zuckerman ......................... 428/235

Primary Examiner—Marion E. McCamish
Attorney, Agent, or Firm—Bell, Seltzer, Park & Gibson

[57] ABSTRACT

The composite upholstery fabric includes a loosely woven or open type fabric, a nonwoven scrim backing with fibers of the woven fabric being needled into and through the nonwoven scrim, and a latex coating adhered to and at least partially penetrating the nonwoven scrim to lock the fibers of the woven fabric in position and to aid in preventing separation of the woven fabric and the nonwoven scrim. The composite upholstery fabric has a good stability and is sufficiently flexible that the fabric may be easily positioned on various sharp turns and corners of upholstered furniture.

8 Claims, 6 Drawing Figures

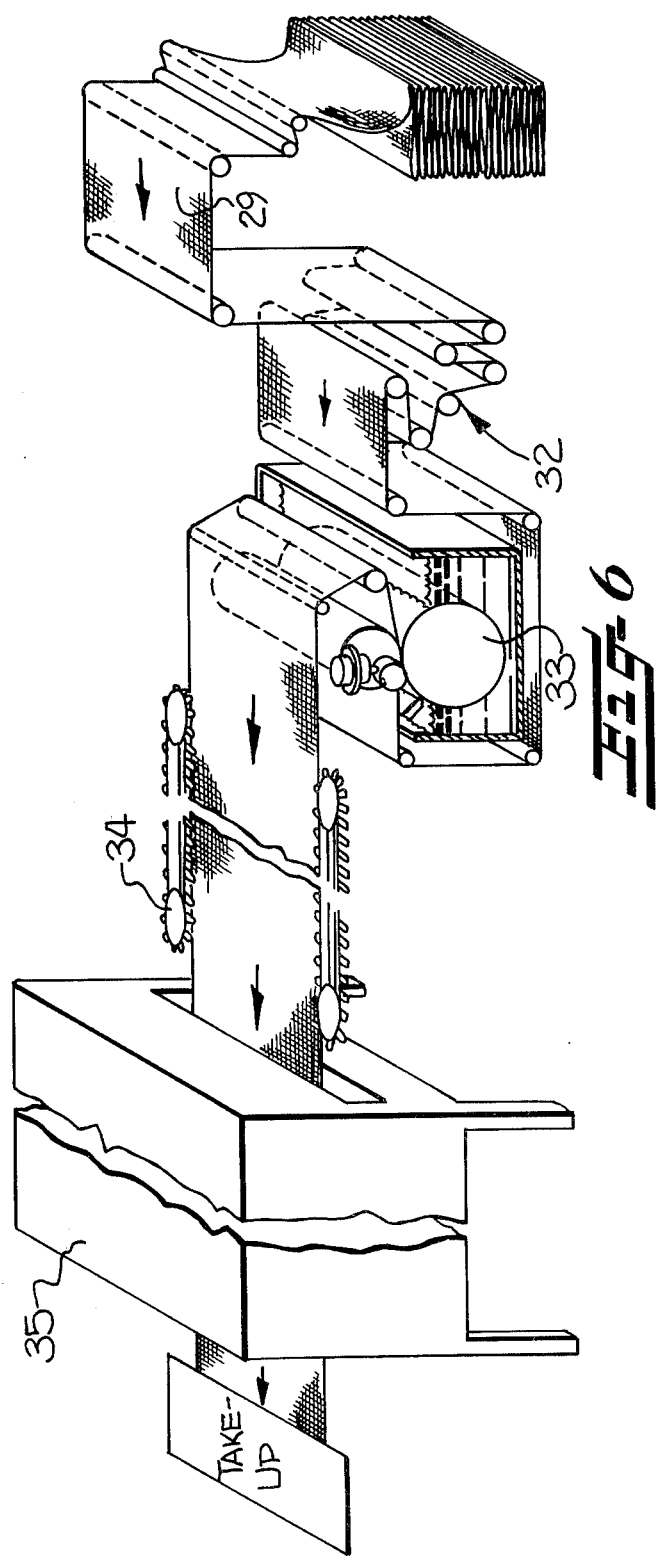

COMPOSITE UPHOLSTERY FABRIC AND METHOD OF FORMING SAME

FIELD OF THE INVENTION

This invention relates to a composite upholstery fabric and method of forming the same which includes a loosely woven or open type fabric, a nonwoven scrim backing with fibers of the woven fabric being needled into and through the nonwoven scrim, and a latex coating adhered to the nonwoven scrim and at least partially penetrating into the woven fabric to lock the fibers of the woven fabric in position and to aid in preventing separation of the woven fabric and the nonwoven scrim.

BACKGROUND OF THE INVENTION

In order to provide a satisfactory fabric for use in upholstered furniture and the like, it is the common practice to weave the fabric of a fairly heavy yarn and with a sufficient number of picks or filling yarns and ends or warp yarns to produce a substantially "closed" fabric which is provided with a relatively heavy coating or backing of latex material. When a heavy and closely woven fabric of this type is provided, the latex coating does not "bleed" through and to the face side of the upholstery fabric. However, this type of closely woven upholstery fabric is heavy and relatively stiff, making it difficult to apply to certain portions of upholstered furniture and giving the fabric a rather stiff and harsh hand. Also, the weaving of this type of fabric requires a substantial weight of yarn, making the fabric expensive to produce.

In an attempt to reduce the weight, stiffness and cost of this type of fabric, a loosely woven or open type fabric has been needled so that some of the fibers from the face side of the fabric are forced through to the reverse side, thereby interconnecting the filling and warp yarns at the crossovers to add stability to the fabric. The needling also provides a fuzzy or nappy rear face on the fabric which tends to cover the rather large interstices or openings between the yarns of the loosely woven fabric so that the tendency of the latex coating to bleed through the fabric is reduced. However, this type of needled loosely woven fabric still requires a relatively heavy coating or backing of latex. Also, in some open weave fabrics, the latex coating still passes through and is visible on the face side of the fabric.

It has also been proposed to adhesively secure a nonwoven scrim to the back or reverse side of a loosely woven fabric. However, the fibers of the woven fabric and the nonwoven scrim are not integrated and the adhesive has not been completely effective to adhere the nonwoven scrim to the loosely woven fabric so that separation between the nonwoven scrim and the loosely woven fabric frequently occurs.

SUMMARY OF THE INVENTION

With the foregoing in mind, it is an object of the present invention to provide a composite upholstery fabric and method of forming the same which includes a loosely woven or open type fabric, a nonwoven scrim backing positioned adjacent and against the rear face of the woven fabric with fibers of the woven fabric being needled into and through the nonwoven scrim, and a latex coating adhered to and at least partially penetrating the nonwoven scrim to lock the needled fibers of the woven fabric in position and to aid in preventing separation of the woven fabric and the nonwoven scrim. The nonwoven scrim also provides a "screen" covering the rather large interstices or openings between the yarns of the woven fabric to further aid in preventing penetration of the latex coating to the face side of the woven fabric.

The needling of the woven fabric forces fibers from the face side through the reverse or rear side and through the nonwoven scrim so that the filling and warp yarns are interconnected at the crossovers to add stability to the fabric. Additionally, the nonwoven scrim is securely locked in position on the rear or reverse side of the woven fabric by the needled fibers and the latex coating so that substantial strength and stability is provided to the loosely woven fabric and the weight of the fabric is maintained at a fairly low level. Also, the composite fabric has a good hand and has high resiliency so that the fabric may be easily positioned on various sharp turns and corners of upholstered furniture.

In accordance with the present invention, the woven fabric is of the type referred to as an open or loose weave with approximately four to seven picks per inch. Of course, the size of the openings between the yarns not only depends upon the number of yarns per inch but also on the size of the yarns. For example, as many as sixteen or more very small yarns per inch could produce a very loose or open fabric. In any event, the present invention is primarily concerned with a lightweight upholstery fabric, that is, a fabric within the range of about three to ten ounces per square yard.

The nonwoven scrim is of the spunbonded type and is of a considerably lesser thickness and weight than the woven fabric, within the range of about 0.3 to 3 ounces per square yard. The fibers of the woven fabric are needled into and through the nonwoven scrim with about 200 to 600 penetrations per square inch and about one to six ounces per square yard of the latex coating is applied to the fabric. The latex coating is preferably provided with sufficient penetrants that the coating will lock the needled fibers in position and penetrate at least partially through the nonwoven scrim to securely bond the nonwoven scrim to the rear face of the woven fabric.

The composite upholstery fabric of the present invention reduces the normal cost of producing upholstery fabric because a lesser number of filling and warp yarns are utilized in initially weaving the fabric and the amount of latex coating normally required is considerably reduced.

BRIEF DESCRIPTION OF THE DRAWINGS

Other objects and advantages will appear as the description proceeds when taken in connection with the accompanying drawings, in which:

FIG. 6 is a somewhat schematic perspective view illustrating the manner in which the latex coating or backing is applied to the composite fabric.

DESCRIPTION OF THE ILLUSTRATED EMBODIMENT

Figure 1:
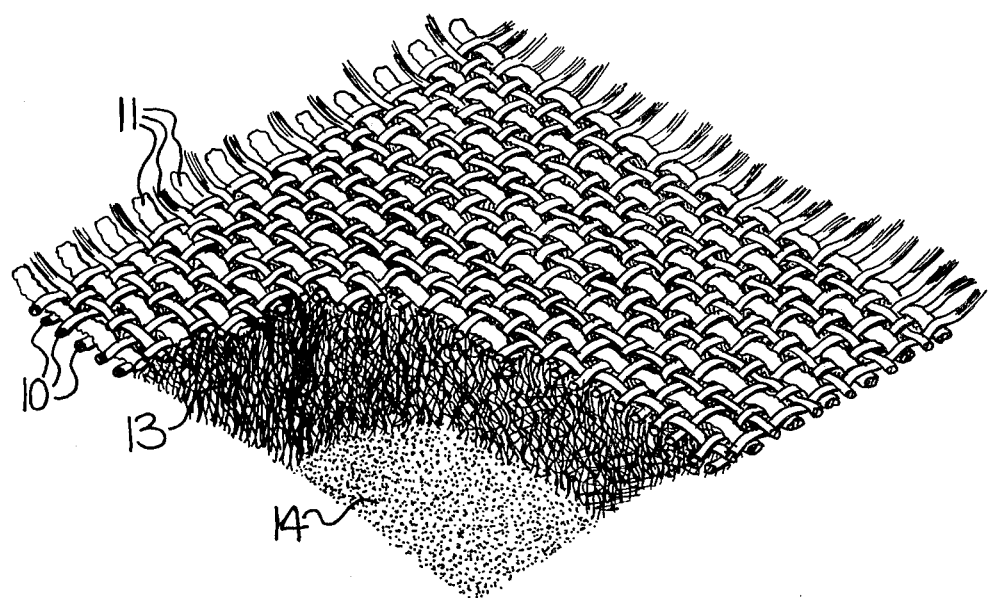
FIG. 1 is a greatly enlarged perspective view of a small portion of the composite fabric of the present invention with portions of the upper components broken away to illustrate the construction of the composite fabric.
Figure 2:
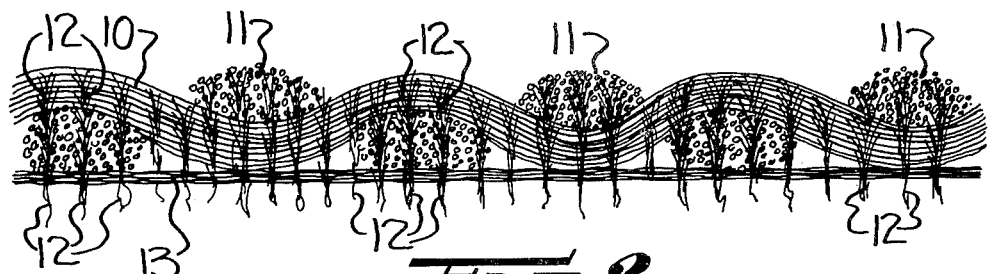
FIG. 2 is a greatly enlarged fragmentary vertical sectional view through the fabric before the coating is applied and illustrating the manner in which some of the fibers from the woven fabric are needled through and extend beyond the lower surface of the nonwoven scrim.
Figure 3:
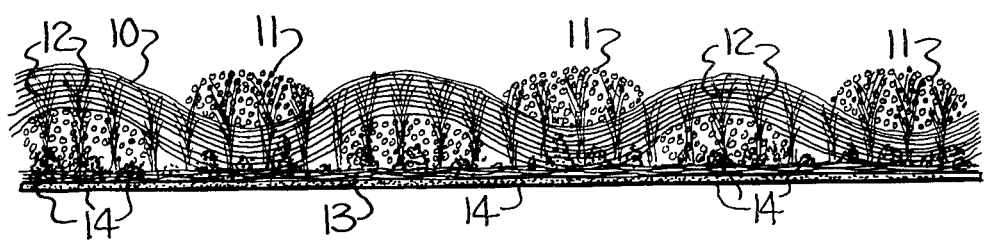
FIG. 3 is a greatly enlarged fragmentary vertical sectional view through the fabric of FIG. 1 and illustrates the manner in which the latex coating locks the needled fibers in position and at least partially penetrates the nonwoven scrim to securely attach the same to the woven fabric.

As illustrated in FIGS. 1-3, the present composite upholstery fabric includes a loosely woven fabric which may be one of any of a number of different types of weave constructions and includes picks, filling or weft yarns 10 interwoven with ends or warp yarns 11. It is preferred that the open or loosely woven fabric contain within the range of about four to seven picks 10 per inch and approximately fifteen warp yarns 11 per inch. As will be noted, fairly large openings or interstices are provided between the picks 10 and the warp ends 11.

The present invention is particulaly concerned with loose or open weave type upholstery fabrics within the range of about three to ten ounces per square yard. However, heavier fabrics are not to be excluded, particularly such fabrics having a weave construction forming separate plies or forming long floats of either the weft or warp yarns.

Fibers, indicated at 12, of the yarns forming the woven fabric are needled into and through a nonwoven scrim 13 which is of a much lesser thickness than the woven fabric and includes upper and lower faces with the upper face positioned against the lower face of the woven fabric. As illustrated in FIG. 2, the needled fibers 12 are forced downwardly from the upper face side of the woven fabric and interconnect and interlock the picks 10 and the warp ends 11 in position at the crossovers to add stability to the fabric. The fibers 12 are forced through the fabric by needling with about 200 to 600 needle penetrations per square inch.

As will be noted in FIG. 3, the portions of the needled fibers 12 which extend through the lower face of the nonwoven scrim 13 are flattened against the lower surface thereof. A latex coating, indicated at 14, is applied to and adhered to the lower face of the nonwoven scrim 13 and covers and encapsulates the portions of the fibers 12 which are flattened against the lower face of the nonwoven scrim 13 to lock these fibers in place and to aid in preventing separation of the woven fabic and the nonwoven scrim 13. The latex coating also penetrates the nonwoven scrim and at least partially penetrates into the lower face of the woven fabric to further aid in preventing separation of the woven fabric and the nonwoven scrim 13.

It is preferred that the nonwoven scrim 13 be of the type known as a spunbonded nylon nonwoven scrim in which the filaments from the spinneret are piddled in a randomly overlapping relationship while still in a soft condition so that they adhere to each other. Several types of nonwoven spunbonded scrims are currently available and it has been found that a nonwoven scrim of this type sold under the name Cerex and manufactured by Monsanto is highly satisfactory. It is preferred that this nonwoven fabric be within the range of about 0.3 to 3 ounces per square yard. The latex coating is provided with suitable penetrants that the coating will penetrate at least partially into the woven fabric and about one to six ounces per square yard of the latex coating is applied to the fabric.

METHOD OF FORMING THE FABRIC

A specific fabric will be described in connection with the description of the method of forming the composite upholstery fabric. However, it is to be understood that this specific method of forming this particular fabric is by way of example and is merely illustrative of the various types of fabric which may be formed in accordance with the present invention, and the present invention is not intended to be limited to this particular fabric.

A flat polypropylene upholstery fabric having a low pick count is woven with six picks per inch and 15 warp ends per inch. The pick or filling yarns 10 are air jet textured and of approximately 2,738 denier. The warp ends 11 are of substantially the same size and type as the picks and a relatively small, approximately 420 denier binder yarn may be interwoven with the yarns 10, 11. The woven fabric weighs 7.31 ounces per linear yard and is 54 inches wide, resulting in a weight of 4.87 ounces per square yard. The woven fabric is very open and loosely woven with rather large openings or interstices between the yarns. The woven fabric has very little stability, particularly when pulled diagonally of the direction of the filling yarns 10 and warp yarns 11.

Figure 4:
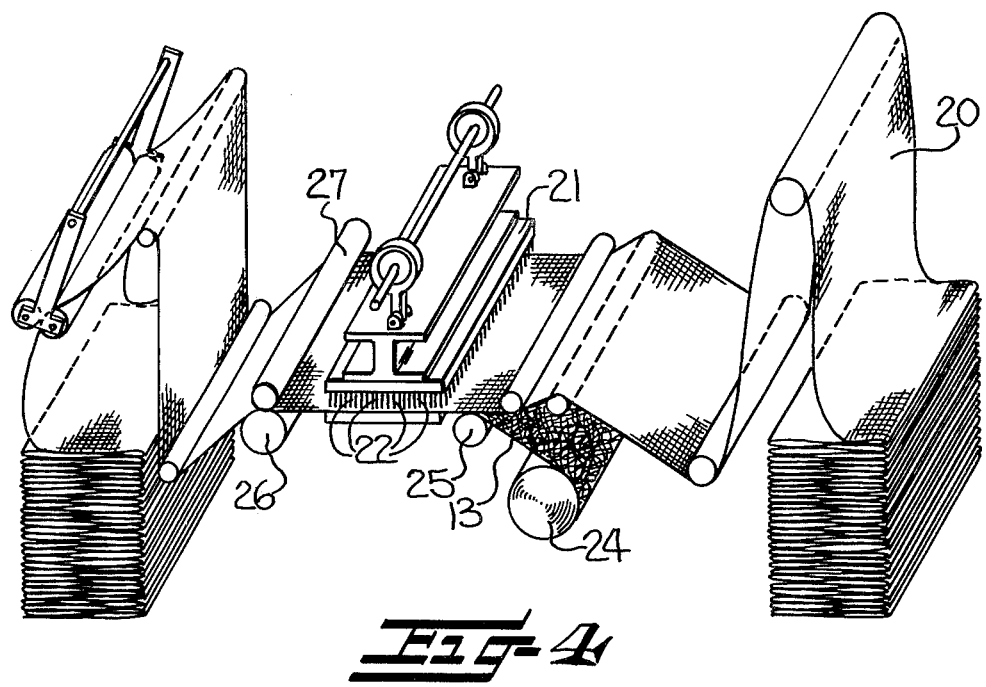
FIG. 4 is a somewhat schematic perspective view illustrating the needling of the nonwoven scrim to the lower surface of the loosely woven fabric.

The woven fabric, indicated at 20 in FIG. 4, is needled by withdrawing the fabric from a folded stack and directing it over suitable guide rolls and through a needle loom which includes a vertically reciprocated needle board 21 having needles 22 for penetrating the woven fabric 20. The face side of the woven fabric 20 is uppermost as it passes beneath the needle board 21. The needles 22 are positioned in the needle board 21 so that a needle density of 96 needles per running inch is provided. The fabric is passed through the needle loom at a sufficient rate that 200 needle penetrations are provided in each square inch of the woven fabric 20.

A supply roll 24 of the nonwoven scrim 13 is supported beneath the path of travel of the woven fabric 20 and passes over an expander roll 25 before being fed through the needle loom with the nonwoven scrim 13 positioned with its upper face against the lower face of the woven fabric 20. As has been explained, the fibers of the woven fabric are forced downwardly through the woven fabric and the nonwoven scrim during the needling operation so that the lower portions of the needled fibers extend through the lower face of the nonwoven scrim 13. The needling of the fabric also causes a slight flattening of the yarns and the needled fibers interconnect the filling and warp yarns at the crossovers to add stability to the fabric. Also, the needled fibers lock the nonwoven scrim and the woven fabric together and add stability to the fabric. The needled fabric then passes between a driven take-up roll 26 and a sand roll 27 and is guided over and between suitable rolls and folded. The nonwoven scrim 13 is of the type sold under the name Cerex manufactured by Monsanto and is of the spunbonded type and weighs 0.4 ounces per square yard.

Figure 5:
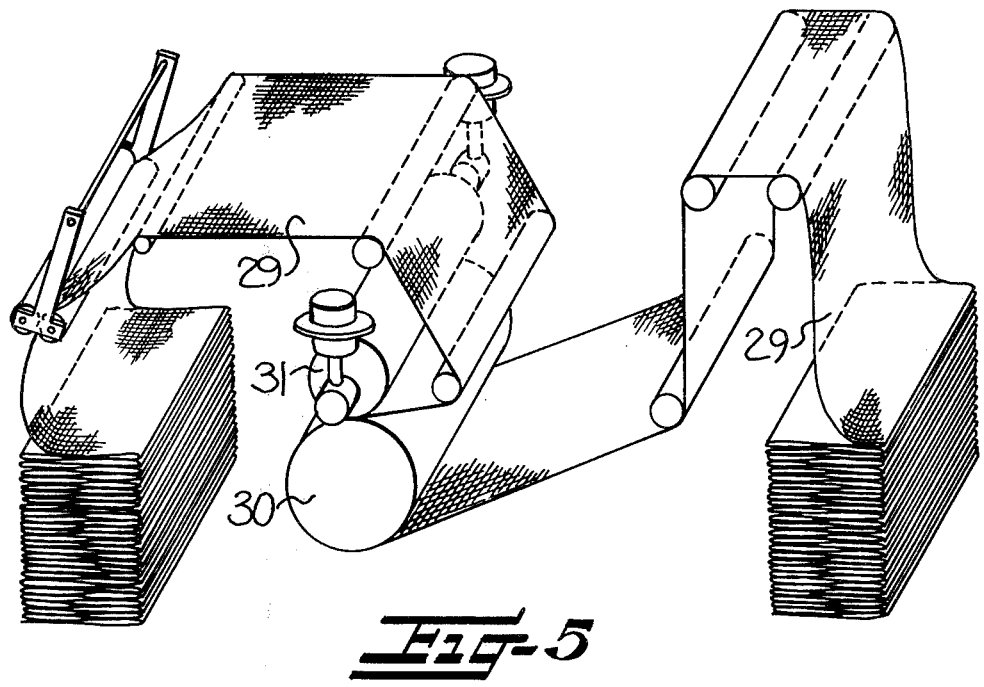
FIG. 5 is a somewhat schematic perspective view illustrating the manner in which the composite fabric is calendered, following the needling operation.

The woven fabric with the nonwoven scrim needled thereto is then passed through a calender, as schematically illustrated in FIG. 5. The fabric with the nonwoven scrim needled thereto, indicated at 29, is withdrawn from a folded stack and passes over suitable guide rolls and around a calendar roll 30 and beneath a pressure roll 31. The pressure roll 31 is suitably pressed against the calender roll 30 by air cylinders or the like. The fabric 29 is then directed over suitable guide rolls and is stacked in folded condition. The calendering of the fabric causes a further flattening or ribboning of the yarns forming the woven fabric and also flattens the protruding end portions of the needled fibers against the lower face of the nonwoven scrim.

The latex coating 14 is then applied to the lower face of the nonwoven scrim by a suitable coating apparatus, such as illustrated in FIG. 6. The woven fabric with the nonwoven scrim needled thereto, indicated at 29, is withdrawn from a folded stack and passes over suitable guide rolls and through a weft straightener broadly indicated at 32. The fabric then passes over a coating roll 33 where the latex coating is evenly applied to the lower face of the nonwoven scrim at the rate of four ounces per square yard. The fabric 29 then passes through a tenter frame 34 and into a curing oven 35 where the latex coating is dried and cured.

The particular latex coating used is of the type known as Compound No. 67 107-B manufactured by Key Polymers Corporation. This is the same general type of SBR latex which has heretofore been used to coat upholstery fabrics but this particular compound includes more penetrants so that the viscosity is lowered and the latex coating encapsulates the portions of the fibers of the woven fabric which extend through and are flattened against the lower face of the nonwoven scrim, as illustrated in FIG. 3. The latex coating also penetrates the nonwoven scrim and at least partially into the lower face of the woven fabric to further aid in preventing separation of the woven fabric and the nonwoven scrim. The latex coating is applied to the fabric at the rate of four ounces per square yard.

After curing of the latex coating, it is virtually impossible to separate the coating and the nonwoven scrim from the woven fabric and the resulting fabric has a high degree of stability, a good hand, and a pliable and resilient characteristic which has not been heretofore available in the relatively heavy weight upholstery type fabrics with a relatively heavy latex coating applied thereto. The needling of the nonwoven scrim to the rear face of the woven fabric acts to stabilize the woven fabric and the nonwoven scrim acts as a "screen" to aid in preventing "bleed through" of the latex coating to the face side of the fabric.

While the present invention is disclosed as being of particular value in connection with a woven upholstery fabric, it is to be understood that a loose or open type knitted fabric can be needled to the nonwoven scrim and secured thereto by the latex coating. The composite fabric of the present invention is described as upholstery fabric but it is to be understood that the present fabric may be used for other purposes. The coating adhered to and penetrating the lower face of the nonwoven scrim is not to be restricted to latex but may be of another suitable type of adhesive or chemical binder.

In the drawings and specification there has been set forth a preferred embodiment of the invention, and although specific terms are employed, they are used in a generic and descriptive sense only and not for purposes of limitation, the scope of the invention being defined in the claims.

That which is claimed is:

1. A composite upholstery fabric comprising
   (a) a woven or knitted fabric having an upper face and a lower face,
   (b) a nonwoven scrim including upper and lower faces with said upper face positioned against said lower face of said fabric,
   (c) fibers of said fabric being needled into said nonwoven scrim with portions of said needled fibers of said fabric extending through said lower face of said nonwoven scrim and being flattened thereagainst, and
   (d) a coating adhered to said lower face of said nonwoven scrim and encapsulating the portions of said fibers of said fabric which extend through and are flattened against said lower face of said nonwoven scrim to lock said fibers in place and aid in preventing separation of said fabric and said nonwoven scrim, said coating also penetrating said nonwoven scrim and penetrating at least partially into said lower face of said fabric to further aid in preventing separation of said fabric and said nonwoven scrim.

2. A composite upholstery fabric according to claim 1 wherein said fabric is woven and said nonwoven scrim is of a lesser thickness than said woven fabric.

3. A composite upholstery fabric according to claim 2 wherein said woven fabric is of an open or loose weave including a range of from four to seven picks per inch and having a weight of from about three to ten ounces per square yard.

4. A composite upholstery fabric according to claim 2 wherein said nonwoven scrim is within the range of about 0.3 to 3 ounces per square yard.

5. A composite upholstery fabric according to claim 2 wherein said woven fabric is needled to said nonwoven scrim with approximately 200 to 600 needle penetrations per square inch.

6. A composite upholstery fabric according to claim 2 wherein said coating is latex and is applied to the lower face of said nonwoven scrim in an amount within the range of about one to six ounces per square yard.

7. A method of forming a composite upholstery fabric comprising the steps of
   (a) moving a woven or knitted fabric having an upper face and a lower face along a predetermined path of travel,
   (b) passing a nonwoven scrim in juxtaposition along said given path of travel with the upper face of the nonwoven scrim positioned against the lower face of the fabric,
   (c) needling said juxtapositioned fabric and nonwoven scrim while forcing fibers of the fabric into and through the nonwoven scrim, and
   (d) applying a coating to said lower face of the nonwoven scrim to encapsulate the portions of the fibers of the fabric which extend through the lower face of the nonwoven scrim to lock the fibers in place and aid in preventing separation of the fabric and the nonwoven scrim, and while also penetrating the nonwoven scrim and at least partially into the lower face of the fabric to further aid in preventing separation of the fabric and the nonwoven scrim.

8. A method according to claim 7 wherein the fabric is woven and the nonwoven scrim is of lesser thickness than the woven fabric, and including the step of calendering the needled juxtapositioned woven fabric and nonwoven scrim to flatten the portions of the fibers extending through the lower face of the nonwoven scrim prior to the step of applying the coating.

* * * * *